United States Patent [19]
Corvi et al.

[11] 3,881,473
[45] May 6, 1975

[54] ULTRAVIOLET LIGHT CURABLE ORTHOPEDIC CAST MATERIAL AND METHOD OF FORMING AN ORTHOPEDIC CAST

[75] Inventors: Joseph A. Corvi, Newport Beach; Donald C. Garwood, Santa Monica, both of Calif.

[73] Assignee: Merck & Co., Inc., Rahway, N.J.

[22] Filed: Feb. 8, 1974

[21] Appl. No.: 440,936

Related U.S. Application Data
[63] Continuation of Ser. No. 209,766, Dec. 20, 1971, abandoned.

[52] U.S. Cl. ............ 128/90; 128/156; 161/93; 66/195; 204/159.15
[51] Int. Cl. ............................................ A61f 13/04
[58] Field of Search ............ 128/90, 83, 156; 28/74; 66/195; 139/387 R; 161/93; 204/159.15

[56] References Cited
UNITED STATES PATENTS
3,421,501  1/1969  Beightol................ 128/90
3,686,725  8/1972  Nisbet et al.............. 28/74 R

*Primary Examiner*—Richard A. Gaudet
*Assistant Examiner*—J. Yasko
*Attorney, Agent, or Firm*—Martin L. Katz; Harry E. Westlake, Jr.

[57] ABSTRACT

An orthopedic cast material which when wrapped about a body member and cured by exposure to ultraviolet light, forms a rigid immobilizing structure and which comprises a highly light and air permeable non-irritating textile of interknit or interwoven yarns, and an ultraviolet light curable resin system carried by said yarns, said textile being of a mesh having essentially regularly spaced generally rectilinear openings with side dimensions between about 0.045 inches and 0.150 inches and wales or warp yarns separating adjacent openings to provide an average thickness to the textile of between about 0.035 inches and 0.060 inches.

24 Claims, 5 Drawing Figures

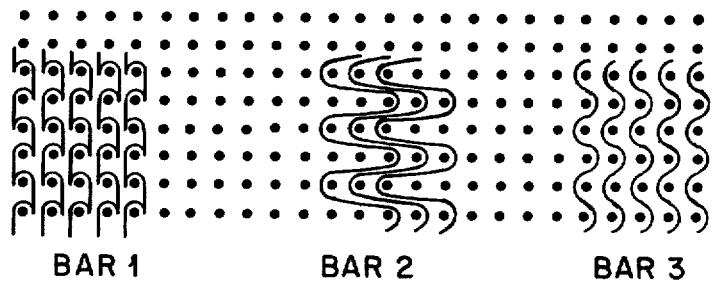
FIG.—1
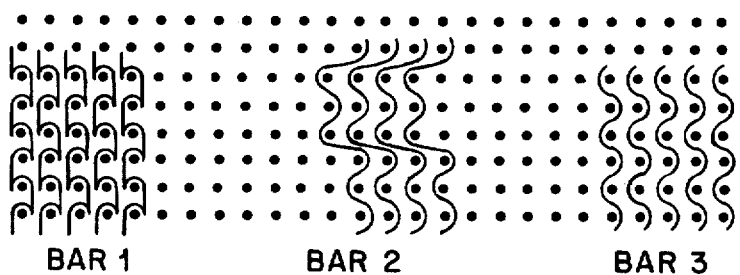
FIG.—2
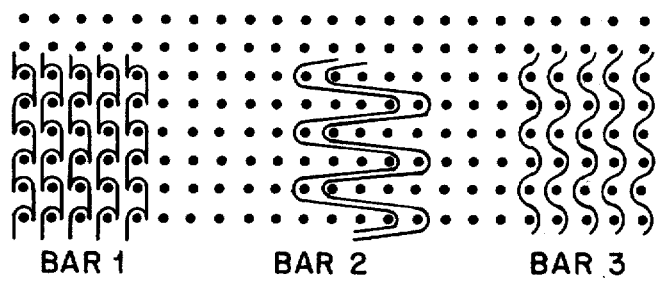
FIG.—3

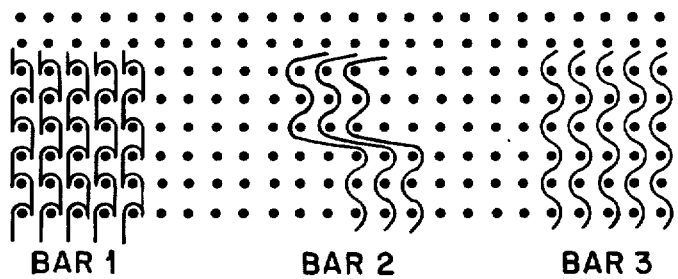
FIG.—4
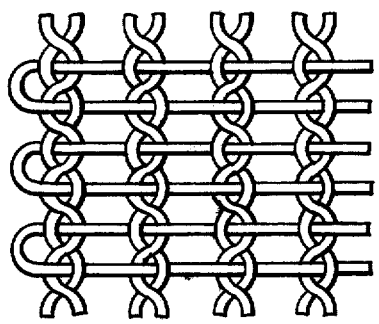
FIG.—5

ULTRAVIOLET LIGHT CURABLE ORTHOPEDIC CAST MATERIAL AND METHOD OF FORMING AN ORTHOPEDIC CAST

This is a continuation of application Ser. No. 209,766, filed Dec. 20, 1971, now abandoned.

PRIOR ART AND BACKGROUND

A lightweight immobilizing cast for a body member employing a fabric tape impregnated with a dry ultraviolet light curable resin is disclosed in U.S. Pat. No. 3,421,501. While this cast has been successfully employed in the medical profession, it has been necessary to apply the resin impregnated tape in two or more separate wrapping and curing operations to achieve sufficient strength and thickness in the cured cast. Since the resin impregnated tape absorbs ultraviolet light, only a limited thickness of the laminated material can be cured by irradiation of its exposed surface by ultraviolet light. Layers of material below this limiting thickness do not receive enough ultraviolet intensity to cure in a convenient exposure time. Furthermore, the layers of material which are cured under these conditions have not been thick enough to impart the degree of rigidity and strength required of an immobilizing cast. Consequently, a second wrapping of tape over a previously cured wrapping followed by a final curing exposure has been found necessary to achieve the required immobilization.

The present invention provides an orthopedic cast which is formed by a single exposure in a short period of time to ultraviolet light. We have found that one exposure is sufficient to completely cure the resin and provide sufficient strength even for leg casts. While not bound by any theory or mode of operation, it is believed that the improved results of this invention are attributable to the use of fabric, normally glass fabric, wherein the yarns have a spacing between about 0.045 and 0.150 inches. This spacing affords a "window" through which more ultraviolet light can pass than in prior permeable orthopedic cast materials which were tightly woven. The increased passage of ultraviolet light assures the complete curing of the underlying wraps of material, resulting in increased overall cast strength. The spacing reduces the incidence of the filling in of the openings between yarns with resin. The spacing of this invention also results in the formation of interlocking between yarns of superposed wraps. Upon curing, the interlocked structure results in increased strength including load-bearing ability, for any given amount of glass or other fabric.

SUMMARY OF THE INVENTION

Briefly, this invention comprehends an orthopedic cast material which when wrapped about a body member and cured by exposure to ultraviolet light, forms a rigid immobilizing structure and which comprises a highly light and air permeable nonirritating textile of interknit or interwoven yarns and an ultraviolet light curable resin system carried by said yarns, said textile being of a mesh having essentially regularly spaced generally rectilinear openings with side dimensions between about 0.045 inches and 0.150 inches and wales or warp yarns separating adjacent openings to provide an average thickness to the textile of between about 0.035 inches and 0.060 inches.

An object of this invention is to provide for the improved application of orthopedic casts formed of lightweight, reinforced plastic wherein the enclosing of a body member in an uncured reinforced plastic is followed by a singly curing, hardening or setting of the plastic by exposure to ultraviolet radiation.

Another object of the present invention is to provide an orthopedic cast material including a glass fabric and a resin impregnated therein, which cast material possesses improved light and air permeability and conformity, and which is nonirritating to human or animal skin.

Still another object of this invention is the provision of an ultraviolet light curable resin-impregnated tape which is readily conformed to the contours of the body member during wrapping.

A further object of our invention is to provide an improved cast material which has increased strength and rigidity.

These and other objects and advantages of this invention will be apparent from the accompanying drawings and the detailed description which follows.

BRIEF DESCRIPTION OF THE DRAWINGS

FIGS. 1 to 4 are three bar Rascel knits in which guide bar 1 performs a simple chain stitch while the other two guide bars perform lapping motions to lay in yarn.

FIG. 5 is a leno weave structure.

DESCRIPTION OF PREFERRED EMBODIMENTS

The yarns are preferably composed of a plurality of glass filaments having an individual diameter less than about 0.00021 inches. This diameter has been found to be less irritating to the skin of the body member. In any glass fiber-based cast system, a certain number of broken filaments occur, resulting in loose ends some of which come in contact with the skin. The glass filaments of the indicated size are less irritating than the filaments of larger size.

The ideal fabric for an ultraviolet cured system should be as transparent as possible to the curing light so that the light is efficiently utilized in hardening of the resin and so that several layers of resin impregnated fabric are penetrated by the light. Glass fabrics have light transmission perperties which are suitable for this application as are certain other polymeric fabrics such as those based on nylon. Furthermore, glass fibers have high strength and lower water absorption which render such fabrics desirable for use in an orthopedic casting material.

Although conventional glass fiber fabrics have high strength, dimensional stability, and do not absorb water, such fabrics also possess several undesirable characteristics. For example, the individual fibers or filaments are easily fractured. Once broken and free, the loose filaments become highly abrasive and irritating, especially when brought into contact with human skin. Also, the nonresilience of the conventional glass fibers have hindered their use in a cast system since the fabric must be flexible and readily conformable to the contours of the wearer's limb or body. It has been found that these objectionable features of conventional glass fabrics can be avoided through use of finer glass filament whose average diameter is less than 0.00018 inches. Such filaments are flexible and less easily broken. Commercially available fine glass filaments possessing the above characteristics are known as "B" or beta-fiber filaments having an average diameter of approximately 0.00015 inches and "C" fiber filaments having an average diameter of approximately 0.00018 inches. Consequently, the use of glass fibers, fabricated from yarn of B or C glass, in an orthopedic cast system is feasible.

Glass filaments of a diameter of approximately 0.00021 inches are known as D filaments and are generally satisfactory in veterinary applications where the orthopedic cast material contacts the skin of animals.

The manner of applying an orthopedic cast which embodies the teachings of the present invention is as follows. An inner protective sleeve is positioned about the limb or body member of the patient. The sleeve takes the form of a tubular stockinet or some other convenient form such as for example an elongated strip or bandage which may be wrapped about the body member. The sleeve may be treated with or carry a bacteriostatic agent such as hexachlorophene.

The inner protective sleeve preferably comprises an air permeable fabric whereby ventilating air may pass through both the sleeve and immobilizing structure to the surface of the skin. Also, the sleeve preferably comprises a fabric which does not appreciably absorb water where the entire cast is quick to dry after exposure to water. This structure also permits the escape of perspiration which would otherwise tend to build up and produce skin irritation and an unpleasant odor. Typically, the stockinet is a knitted or woven crystalline polypropylene material which is inherently nonwetting and permeable.

With the sleeve in proper position, an orthopedic cast material comprising a fabric impregnated with a resin, as further described herein is wrapped about the body member and over the protective sleeve in a manner similar to the application of an elastic-type bandage. Typically, the orthopedic cast material may be prepared for commercial use in nine foot rolls, and in one, two, three, four inch widths, or more. Selection of the particular width varies with the type of cast being applied. The material is highly flexible, and may be easily folded, twisted, tucked, or spread to conform to the irregular contours of the patient's anatomy.

The number of overwraps of tape used to form a cast according to this invention is preferably about two to five. However, more overwraps, up to about eight, are contemplated for certain applications. When the material is in place, the resin in the material is cured typically by exposure to ultraviolet light for less than approximately 6 minutes, and preferably less than 2 minutes, causing the layers of the material to harden and adhere together to form a rigid, lightweight, immobilizing structure.

The preferred fabric of this invention is comprised of yarns interlaced or woven in such a manner that generally rectilinear openings are formed in the fabric. Furthermore, the wales in the case of knitted fabric or the warp in the case of woven fabric as they pass over the courses of weft yarns, respectively, provide periodic fluctuations in the surface of the material so that the periodic ridges thereby formed enhance the interlocking of overlapping layers of the fabric.

In general, the yarns are woven or knitted so that the windows in the fabric are square or rectangular. Preferably, the fabric is of a Raschel knit which affords a lateral stretchability without lengthwise stretchability in the tape. Lateral stretch provides a high degree of conformability to the body member. The resistance to lengthwise stretch in the tape has been found to prevent undesirable restriction of circulation within the body member.

The fabric may be comprised of natural, polymeric or glass yarns. Glass yarns used in the fabric consist essentially of highly flexible filaments having an average diameter not greater than about 0.00021 inches.

The resin is adhered to the yarns of the fabric in a quantity sufficient to wet the yarns but insufficient to completely fill the voids or openings between yarns of the fabric. The openings thus penetrate the complete thickness of the resin impregnated fabric through which the ultraviolet radiation may pass without appreciable attenuation. The sides and edges of the holes formed by the resin impregnated yarns will become hardened upon exposure to ultraviolet light.

The bonding between adjacent layers of a laminate formed from the resin impregnated fabric is accomplished both by the hardening of the resin between adjacent fabric layers and by the interlocking of ridges and valleys of the fabric.

The resin which impregnates the fabric is essentially dry and remains flexible or mobile until cured. The resin impregnated fabric is capable of being stored in an air-tight package at room temperature for periods of time in excess of twelve months, after which time the material is capable of forming interlaminate bonds between successive layers of material and is capable of being formed and hardened into an orthopedic cast.

The preferred ultraviolet curable resin system readily hardenable upon exposure to ultraviolet irradiation comprises a photoinitiated polymerizable resin system, and a benzoin ether or ester having the formula:

wherein R is selected from the group consisting of hydrocarbyl and

wherein R' is hydrocarbyl. Preferably, R and R' are alkyl or aryl containing from about 1 to 10 carbon atoms such as methyl, ethyl, propyl, decyl, phenyl, phenyl and the like.

The resin system based upon ethers and esters of benzoin has been found to result in improved shelf-life when compared to the previously known system based on unsubstituted benzoin. Typical of such ethers and esters are benzoin methyl ether, benzoin ethyl ether, benzoin isopropyl ether, benzoin formate ester, benzoin acetate ester and benzoin propionate ester, with the said ethers and the benzoin acetate ester being preferred.

The preferred ultraviolet band for the hardening of the resins is at a narrow band having a maximum energy and peak wavelength from about 3,650 Angstroms to 3,720 Angstroms. This preferred band provides at least 50 percent of the total energy being concentrated in said band and a curing time to achieve the desired strength in as little as 2 or 3 minutes, compared to about 8 minutes at 3,550 Angstroms and 10 minutes at 3,925 Angstroms.

The most preferred resin system of this invention includes a polyester containing carton-to-carbon unsaturation, an ethylenically unsaturated monomer, an inhibitor, and benzoin ethers and esters of the above formula. Typical polyesters are those from unsaturated dicarboxylic acids such as maleic anhydride, saturated aromatic dicarboxylic acids such as isophthalic acid, and aliphatic diols, for example, ethylene glycol, propylene glycol, butylene glycol, etc. The monomer most preferred is vinyl toluene, and similar materials. The inhibitors are usually the various aromatic phenolic-type materials which are already known to those skilled in the art.

The unsaturated monomer is normally employed in an amount equal to about 5 to 50 percent by weight, based on the weight of the polyester. The photoinitiator is used in an amount from about 0.1 to 5 percent by weight of the polyester. It is to be understood that these proportions are not critical, and that other formulations and proportions will be evident to those skilled in the art upon reading the present disclosure.

The orthopedic cast material described herein is characterized by air permeability, conformability, substantial strength and compatibility with skin contact and comprises a relatively open and air permeable fabric having sufficient flexibility to conform to the contours of the body of a wearer.

The following examples of the invention are presented solely to illustrate the invention, and are not intended to be limiting in any way. In the example the parts and percentages are by weight unless otherwise indicated.

EXAMPLE 1

The following resin system was used in the tapes discussed below:

| | |
|---|---|
| Unsaturated polyester resin solids* | 22,480 g. |
| Vinyl toluene | 6,343 g. |
| 4-tertiary-Butylcatechol | 5.76 g. |
| Benzoin methyl ether | 346 g. |
| Acetone | 7,900 ml |

*100% solid maleic/isophthalic alkyd polyester
Unpromoted
No inhibitor added
Acid number: 14 maximum
Melting point (mercury method): 185°F minimum
Viscosity of 60% by weight solution of resin in toluene:
800 cps minimum at 25°C (W+ to W− Gardner), 1400 cps maximum at 25°C.
Color of 60% by weight solution of resin in toluene: 2 maximum on Gardner scale.

The resin system as coated on the fabric and the acetone is substantially evaporated therefrom in a heated oven. This resin system is characterized by low tack in the final but uncured state.

Fiberlass tapes having various sizes of openings or holes in the fabric structure were coated or impregnated with the resin system.

Fabric No. 1 is a tightly knit fiberglass tape 2 inches wide and 0.050 inches average thickness having no measurable openings. This tape was impregnated with 44 percent by weight of resin and when formed into a laminated ring of 2 inches diameter with three layers of impregnated fabric required 30 minutes to achieve a compressive strength of 210 pounds. With 3 minutes of curing exposure to the same light, a three-layer laminated ring was only partially cured with a compressive strength of only 75 pounds. In contrast, Fabric No. 2, a knitted fiberglass tape of the same width, thickness, but having regularly spaced square openings of about three-sixteenths of an inch on a side, and with the same resin content, and wrapped into a laminated ring of 3 layers was completely cured in a 3-minute exposure with a compressive strength of 87 pounds.

Fabric No. 3, a tightly knit fiberglass tape, 2 inches wide and 0.026 inches thick having no measurable openings was impregnated with 50 percent resin, wrapped in a 2 inch diameter ring of five laminations. This tape gave a compressive strength of 215 pounds after 30 minutes exposure to the curing light. Curing times of 6 minutes did not result in a complete cure. The ring breaking strength was 41 pounds. Fabric No. 4, a similar impregnated fabric, but one possessing square openings of about 1/16 inch to a side spaced at regular intervals of about ⅛ inch, formed into a similar five-layer laminated ring was substantially cured in 6 minutes and exhibited a compressive strength of 123 pounds. Although openings in the fabric lessen the cure time, the ultimate strength is less than a tightly formed fabric since the fabric contains less reinforcing yarn to create the openings. This reduction in the fabric weight per unit surface area can be compensated by increasing the fabric thickness or yarn weight. The ultimate strength of a laminate is then increased. Thus, when the open fabric No. 2 of 0.052 inches thick and the tightly knitted fabric No. 3 of 0.026 inches thick, both as described above, were wrapped into laminated rings of 3 layers each, the open fabric had a compressive strength after 3 minutes curing of 87 pounds whereas a 30-minute curing exposure imparts a compressive strength to the ring formed of the closed material also of 87 pounds.

The above results are summarized in Table I.

Because of the inconvenience of wrapping an orthopedic cast with more than six layers thickness we have found that acceptable casting materials must satisfy the following criteria:

1. For non-weight bearing applications, a laminated ring (2 inches high with an inside diameter of 2 inches) must exhibit a ring compressive strength for four or fewer layers cured for 3 minutes or less of at least 85 pounds.

2. For weight bearing applications (walking leg casts), a laminated ring of six or fewer layers cured for 6 minutes or less should exhibit a ring compressive strength of at least 150 pounds.

All tightly knit or woven fabrics tested fail to meet both these criteria since insufficient thickness can be cured with the given light intensity in the time intervals required.

Table II summarizes the fabric parameters and ring compressive strengths for (1) four or fewer layers cured for 3 minutes or less and (2) six or fewer layers cured for 6 minutes or less.

Knitted fabrics No. 2 and No. 6 meet both criteria whereas Fabrics No. 1, No. 3, No. 4 and No. 5 do not meet both criteria. The effect of decreased resin content is also illustrated for Fabric No. 5; reduction of the resin content by 10 percent causes failure of this fabric to meet both criteria.

Fabric No. 7 is an open, woven (leno) fabric in contrast to the others which are laid-in Raschel knitted fabrics. It also fails to meet the criteria.

TABLE I

| Fabric Type | Fabric Weight per Unit Area, g/square inch | Fabric Thickness inches | Resin Content % by Weight | No. of Laminations in Ring | Curing Exposure Time, minutes | Ring Compressive Strength, lbs. |
|---|---|---|---|---|---|---|
| No. 1 Closed | 0.56 | .050 | 44.0 | 3 | 30 | 210 |
| Closed | 0.56 | .050 | 44.0 | 3 | 3 | 75 |
| No. 2 Open | 0.23 | .052 | 43.6 | 3 | 3 | 87 |
| No. 3 Closed | 0.19 | .026 | 50.2 | 3 | 30 | 87 |
| Closed | 0.19 | .026 | 50.2 | 5 | 30 | 215 |
| Closed | 0.19 | .026 | 50.2 | 5 | 6 | 41 |
| No. 4 Open | 0.15 | .024 | 51.4 | 5 | 6 | 123 |

TABLE II

| Fabric | Opening Dimensions, inches | Fabric Thickness inches | Number of Openings in 2 inch width | Resin Content % by Weight | No. of Laminations In Ring | Curing Time minutes | Ring Compressive Strength, lbs. |
|---|---|---|---|---|---|---|---|
| No. 2 | .146 × .146 | .052 | 10 | 43.6 | 4 | 3 | 118 |
|  |  |  |  | 43.6 | 5 | 6 | 162 |
| No. 4 | .055 × .055 | .024 | 19 | 51.4 | 4 | 6 | 73 |
|  |  |  |  | 51.8 | 6 | 6 | 163 |
| No. 5 | .049 × .116 | .028 | 25 | 52.2 | 4 | 5 | 65 |
|  |  |  |  | 52.2 | 6 | 6 | 170 |
|  |  |  |  | 42.7 | 6 | 6 | 128 |
| No. 6 | .045 × .050 | .038 | 19 | 36.6 | 4 | 2 | 102 |
|  |  |  |  | 36.3 | 6 | 6 | 185 |
| No. 7 | .042 × .061 | .022 | 27 | 33.8 | 4 | 5 | 80 |
|  |  |  |  | 33.8 | 6 | 6 | 142 |

Although Fabrics No. 4 and 6 have comparable opening sizes, No. 4 is not heavy enough whereas the added thickness of No. 6 gives it the required strength. The large openings of No. 2 are offset by the large fabric thickness; consequently a rapid cure is possible giving a high strength. Fabrics No. 4, No. 5 and No. 7 are not thick enough to meet the criteria even though their openness is sufficient for a rapid cure. The foregoing data illustrates that under the above criteria the preferred glass fabric possesses an opening size greater than about 0.045 inches per side with adjacent openings separated by wales which produce an average fabric thickness greater than about 0.035 inches.

The seven test fabrics are further described in detail in Table III and FIGS. 1 through 5 of the drawings. Fabrics No. 1 through No. 6 are three bar Rascel knits in which guide bar 1 performs a simple chain stitch while the other two guide bars perform lapping motions to lay in yarn as shown in the point diagrams of FIGS. 1 through 4. In all cases guide bar 3 lays in yarn which runs longitudinally in each wale. Guide bar 2 lays in yarn in such a manner as to connect adjacent wales. The gauge or the number of needles (see Table III) varies from one fabric to the next which together with the lapping motion of guide bar 2 creates the different sized openings in the fabric. Fabrics knitted on machines of high gauge (No. 1 and No. 3) have closely spaced wales and consequently have a tight or closed appearance. Fabrics knitted with lower gauge have larger spacings between wales to generate openings in the fabric.

Fabric No. 7 is a leno weave rather than a knit. The leno structure is depicted in FIG. 5.

TABLE III

| Fabric | Pattern Figure Number | Fiberglass Yarn | Threading of Guide Bars, ends per guide | | | Gauge, number of needles in 2 inches knitting width |
|---|---|---|---|---|---|---|
|  |  |  | Bar 1 | Bar 2 | Bar 3 |  |
| No. 1 | 1 | ECB* 150 3/2 | 1 | 1 | 1 | 28 |
| No. 2 | 2 | ECC* 150 2/2 | 1 | 2 | 3 | 9 |
| No. 3 | 1 | ECB 150 1/0 | 2 | 2 | 2 | 28 |
| No. 4 | 3 | ECB 150 2/0 | 1 | 1 | 1 | 18 |
| No. 5 | 4 | ECB 150 2/0 | 1 | 1 | 1 | 24 |
| No. 6 | 3 | ECB 150 2/2 | 1 | 1 | 1 | 18 |
| No. 7 | 5(leno) | ECB 150 3/2 | — | — | — | 28 ends per inch 10.5 picks per inch |

*ECB denotes yarn of beta fiberglass continuous filament having an E glass formulation. E glass formulation is described in Handbook of Fiberglass and Advanced Plastics Composites, George Lubin Editor, Van Nostrand Reinhold Company, N.Y. (1969) page 150
*ECC is the same as ECB except that C fiberglass continuous filament is used.

The strengths of cured laminates prepared from resin-impregnated fabric tapes are determined by "ring tests." Ring tests are performed in the following manner: the specified number of layers of resin-impregnated tape are wrapped around a 2 inch diameter mandrel. The mandrel with the ring is centered in an ultraviolet lamp which produces a light intensity in the range of 3,600 A to 3,800 A that exceeds a reading of 1,400 $\mu W/cm^2$ on an Ultra-Violet Products, Inc., ultraviolet meter. The mandrel is exposed in the lamp for the specified exposure time and then removed. The ring is slipped off the mandrel and allowed to stand at room temperature for a minimum of 15 minutes.

Next the ring is supported in a fixture with two 'knife' (⅛ inch radius) edges spaced 1.6 inches apart parallel to the ring axis. A third 'knife' edge is centered over the top of the ring also parallel to the axis. The ring is loaded through these three line contacts. The load is applied until a maximum load has been achieved. The maximum load is the "ring compressive strength."

Having fully defined the invention, it is intended that it be limited only by the lawful scope of the appended claims.

We claim:

1. An orthopedic cast material which when wrapped about a body member and cured by exposure to ultraviolet light, forms a rigid, high strength immobilizing structure and which comprises a highly light and air permeable nonirritating open textile fabric of interknit or interwoven glass yarns and an ultraviolet light curable resin system carried by said yarns, said open textile fabric being of a mesh having essentially regularly spaced generally rectilinear openings with side dimensions between about 0.045 inches and 0.150 inches and wales or warp yarns separating adjacent openings to provide an average thickness to the open textile fabric of between about 0.035 inches and 0.060 inches in order to permit the ultraviolet rays to penetrate the multiplicity of layers of wrapped fabric that is required to produce an orthopedic cast.

2. The material of claim 1 wherein the resin system contains a benzoin ether or ester.

3. The material of claim 1 wherein the resin system is curable at a wavelength from about 3,650 A to 3,720 A.

4. The cast material of claim 1 wherein said fabric comprises a relatively narrow elongated strip having selvages extending along its longitudinal side edges.

5. The cast material of claim 1 wherein the filaments of said glass yarns have an average diameter between about 0.00015 inches and about 0.00018 inches.

6. The cast material of claim 1 wherein the textile fabric has rectangular openings between the yarns.

7. The cast material of claim 1 wherein the textile is knitted and is characterized by lateral stretchability and resistance to lengthwise stretchability.

8. The cast material of claim 1 wherein the textile fabric is of a Raschel knit.

9. A hard, porous, nonwetting, high strength orthopedic cast comprising a plurality of advancing and overlapping wraps of a material which comprises a highly light and air permeable nonirritating open textile fabric of interknit or interwoven glass yarns and an ultraviolet light curable resin system carried by said yarns, said open textile fabric being of a mesh having essentially regularly spaced generally rectilinear openings with side dimensions between about 0.045 inches and 0.150 inches and wales or warp yarns separating adjacent openings to provide an average thickness to the textile of between about 0.035 inches and 0.060 inches in order to permit the ultraviolet rays to penetrate the multiplicity of layers of wrapped fabric that is required to produce an orthopedic cast.

10. The cast of claim 9 wherein a stockinet is provided within said cast.

11. The cast of claim 9 wherein a knitted polypropylene stockinet is provided within said cast.

12. The cast of claim 9 wherein the overwraps number from about 3 to 5.

13. The cast of claim 9 wherein the resin system contains a benzoin ether or ester.

14. The cast material of claim 9 wherein said fabric comprises a relatively narrow elongated strip having selvages extending along its longitudinal side edges.

15. The cast material of claim 9 wherein the filaments of said glass yarns have an average diameter between about 0.00015 inches and about 0.00018 inches.

16. The cast material of claim 9 wherein the textile is knitted and is characterized by lateral stretchability and resistance to lengthwise stretchability.

17. The cast material of claim 9 wherein the textile fabric is of a Raschel knit.

18. The method of forming an orthopedic cast which comprises wrapping a body member in a highly light and air permeable nonirritating open textile fabric of interknit or interwoven glass yarns and an ultraviolet light curable resin system carried by said yarns, said open textile fabric being of a mesh having essentially regularly spaced generally rectilinear openings with side dimensions between about 0.045 inches and 0.150 inches and wales or warp yarns separating adjacent openings to provide an average thickness to the textile of between about 0.035 inches and 0.060 inches in order to permit the ultraviolet rays to penetrate the multiplicity of layers of wrapped fabric that is required to produce an orthopedic cast, and hardening said resin system by exposure to a source of ultraviolet light radiation to form a rigid, strong, light and air permeable, nonirritating cast.

19. The method of claim 18 wherein a stockinet is placed on said body member prior to said wrapping.

20. The method of claim 18 wherein a knitted polypropylene stockinet is placed on said body member prior to said wrapping.

21. The method of claim 18 wherein the overwraps number from three to five.

22. The method of claim 18 wherein the cast is formed by a single exposure to a source of ultraviolet light.

23. The method of claim 18 wherein the cast is formed by exposure to ultraviolet light in the range between 3,650 A and 3,720 A.

24. The method of claim 18 wherein the exposure to a source of ultraviolet light is from about 3 to 6 minutes to essentially harden every overwrap in the cast.

* * * * *